UNITED STATES PATENT OFFICE 2,465,109

HYDROPHILIC POLYCARBONAMIDE PHOTOGRAPHIC SILVER SALT LAYERS

David Malcolm McQueen and Clay Weaver, Wilmington, Del., assignors to E. I. du Pont de Nemours & Company, Wilmington, Del., a corporation of Delaware No Drawing. Application October 19, 1945, Serial No. 623,458

7 Claims. (Cl. 95—7)

This invention relates to photographic elements having at least one layer comprising a hydrophilic polyamide containing extralinear carboxylic acid salt groups and to their preparation and photographic processing.

Gelatin is by far the most widely used binding agent colloid for silver halides in commercial photographic emulsions. However, gelatin has inherent disadvantages which place restrictions upon its use. For example, emulsion coats of gelatin become very soft in warm water, hence processing solutions must be kept cold. Further, gelatin is rapidly attacked by certain bacteria and consequently such films deteriorate rapidly, especially in hot, humid climates. Many types of synthetic binders for silver halides have been proposed to overcome the disadvantages of gelatin, but these have met with little commercial success. This is largely due to their lack of natural sensitizers peculiar to gelatin and because solutions of these synthetic polymers do not rapidly set to gels similar to gelatin.

An object of this invention is to provide photographic elements with improved water-permeable layers. A further object is to provide such elements which are of good quality and free from the disadvantages of gelatin. A still further object is to provide photographic elements with water-permeable colloid-silver halide emulsion layers which are tough, strong, flexible, are of good quality and do not become weak or dissolve at processing temperatures. Still other objects will be apparent from the following description of the invention.

In accordance with the broadest aspects of the invention, a composition comprising a solvent, a hydrophilic intralinear polycarbonamide which has, as a substituent on a plurality of intralinear amido nitrogen atoms of the polyamide chain, a group of the formula —$CH_2OQ$, where Q is the organic radical obtained by removal of the OH groups from a water-soluble salt of a hydroxyalkane carboxylic or sulfonic acid and a light-sensitive material, dye, pigment, color former or other component of a layer of a photographic element is coated onto a suitable base or layer on a base, and dried. A plurality of such coatings can be made in the case of multilayer elements.

In a preferred aspect of the invention a dispersion of a light-sensitive silver halide in a polycarbonamide of the above type is made and an aqueous solution is prepared and coated onto a suitable support, e. g., metal, paper, glass or a transparent film such as cellulose nitrate, cellulose acetate or a synthetic resin or super-polymer, e. g., polyvinyl formal, polyhexamethylene adipamide, etc., or another coating of the same material, and dried.

The silver halide dispersions in the polyamides are prepared by admixing a soluble halide such as ammonium bromide with a solution of an aforedescribed hydrophilic polycarbonamide and a solution of a soluble silver salt such as silver nitrate is added with stirring whereby finely divided silver halides are precipitated throughout the polycarbonamide. The dispersion is then ripened and may be used in this stage for the preparation of sensitive film elements. However, if desired, the unwashed dispersion may be freed of soluble salts by washing, then redissolved in water or fresh polymer solution, digested, sensitized, etc., and coated on a suitable support. Washing of the dispersion or emulsion to free it of soluble salts may be accomplished in various ways. It may be coagulated by the addition of an excess of a flocculating agent, such as acetone, the supernatant liquid decanted, and the curds washed by immersion in water, or the unwashed emulsion may be set or gelled by prolonged cooling, the gel shredded and washed in water. The emulsion is melted and coated on baryta-coated paper or a cellulose derivative film base or other suitable support and dried. It is exposed to light from an object and the latent image developed and fixed in the same manner as gelatin-silver halide emulsion layers. Development, for example, may be conveniently carried out in a standard p - methylaminophenol - hydroquinone developer and the unreduced silver halide removed by treatment with sodium thiosulfate solution. The light-sensitive layer may then be hardened by immersion for a brief period in a dilute solution of a weak acid such as acetic acid and any soluble salts may be removed by washing the print in water.

Treatment of the film elements of this invention with dilute acid is very advantageous and an important feature of the invention. It converts the colloid binder from a hydrophilic polycarbonamide to an insoluble, relatively water-insensitive, tough, abrasion-resistant polycarbonamide. The action of acid apparently removes the solubilizing salt groups from the amido nitrogen atoms, leaving essentially an insoluble linear polycarbonamide. Thus, the photographic elements have the great advantage that, in the finished picture, the silver image is held by a tough, strong, flexible layer of polycarbonamide which is unaffected by water and most organic solvents and resists bacterial attack. Since the acid treatment destroys or reduces the hydrophilic character of the polycarbonamide layers, it is desirable to apply this step following the development step and in some cases following the fixing and/or washing steps. The exact position of the acidic treating step in the processing is determined by the water-sensitivity of the specific polycarbonamide. For example, if the polycarbonamide is very water-sensitive, it is desirable to use an acid treatment immediately after development. This, however, should not be carried out for too long a time or at too high a temperature or at too low a pH in order to prevent complete loss of the hydrophilic character at this stage since elimination of the hydrophilic character of the polymer interferes with the fixing and washing operations. In most cases the polycarbonamide is not softened greatly by prolonged contact with aqueous baths and the acid treatment may be postponed until after fixing or the final washing.

Suitable acidic treating baths may contain from 0.1 to 5% of an acid, e. g., acetic, hydroxyacetic, formic, maleic, tartaric or citric acids. More concentrated solutions or stronger acids, such as hydrochloric, sulfuric, phosphoric, and p-toluenesulfonic acids, can be used but appear to offer no advantages. Acidic reacting salts such as ammonium chloride, aluminum sulfate and zinc chloride can also be used.

The time and temperature of the treatment can be varied within fairly wide limits. A suitable procedure is 1–5 minutes at 20–30° C. with 1% acetic acid.

While acidic fixing baths will cause the insolubilizing effect, this type of treatment is not always desirable because of the difficulty of applying suitable control. It is usually desirable to fix for a much longer time than is necessary to insolubilize the polycarbonamide so that the film in a combined acid-hypo bath, for instance, fixes rather poorly. A preferred procedure is, therefore, to fix with neutral hypo and subsequently treat with acid.

The hydrophilic intralinear polycarbonamides used in accordance with the present invention can advantageously be prepared by reacting a linear polycarbonamide with formaldehyde, (paraformaldehyde, trioxane or a formaldehyde-liberating material) and a hydroxyalkane carboxylic acid or a monohydric alcohol ester thereof, in the presence of an oxygen-containing acid catalyst until the desired degree of interaction has taken place. The resulting compounds if they contain free acid groups can be converted into salts by metathesis or a simple neutralization with a base. Those containing an ester group can be converted into acids by hydrolysis and neutralization, e. g., with an aqueous or alcoholic solution of a base, e. g., sodium, potassium, ammonium or substituted ammonium hydroxide. Their preparation is described below and more fully in Cairns application Serial No. 539,399, filed June 8, 1944, now Patent No. 2,430,907 of November 18, 1947.

The polycarbonamides used as starting materials in the practice of this invention are of the general type described in United States Patents 2,071,250, 2,071,253 and 2,130,948. These polycarbonamides can be obtained by the methods given in the aforesaid patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polycarbonamides obtained from these reactants have a unit length of at least 7, where "unit length" is defined as in United States Patents 2,071,253 and 2,130,948. The average number of carbon atoms separating the amide groups in these polyamides is at least two.

These linear polycarbonamides include also polymers, as for instance the polyester-amides, obtained by admixture of other linear polymer-forming reactants, as for instance glycol-dibasic acid mixtures or hydroxy acids, with the mentioned polyamide-forming reactants. Both the simple and modified linear polyamides contain the recurring amide groups

in which R is hydrogen as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

Suitable specific polyamides include polyhexamethyleneadipamide, polyhexamethylenesebacamide, hexamethylene diammonium adipate/hexamethylene diammonium sebacate/epsiloncaperolactam interpolymer, polydecamethyleneadipamide, polydecamethylenesebacamide, epsilon-caprolactam polymer and hexamethylene diammonium sebacate/triglycoldiammonium adipate interpolymer 80/20.

Suitable acid catalysts are formic, acetic, chloroacetic, trimethylacetic, oxalic, p-toluenesulfonic, benzoic, maleic and phosphoric. When a hydroxyacid, rather than an ester thereof, is used as a reactant, it is not necessary to add another acid as catalyst although it is preferable to do so. The term "oxygen-containing acid" comprises mixtures of oxygen-containing acids and includes hydroxy carboxylic acids.

Examples of hydroxyalkane carboxylic acids which can be used are glycolic, lactic, tartaric, alpha-hydroxy-butyric, alpha-hydroxyisobutyric, delta-hydroxyvaleric and epsilon-hydroxycaproic acids and their esters, e. g., the methyl, ethyl, butyl, methoxyethyl, cyclohexyl, and benzyl esters. The corresponding nitriles (hydroxynitriles) can also be used followed by hydrolysis to the carboxylic acid salts. Although hydroxyalkane carboxylic acids are preferred, the invention is not limited to such compounds. Other suitable acids include beta-hydroxyethyl sulfonic acid, as well as hydroxy sulfonic acids and esters corresponding to the aforementioned carboxylic derivatives. They can be used in a similar manner. Moreover, the hydroxyalkane acids and esters may be substituted with groups or radicals which are inert to light-sensitive materials.

The relative concentrations of reagents used can be varied considerably. Small amounts of formaldehyde (for example, 5% based on the weight of the polyamide) are operable and produce a definite change in the properties of the polyamide used. It is desirable, however, to use at least 25% formaldehyde, amounts varying from 25 to 200% of the polyamide being used to greatest advantage. The ratio of formaldehyde to hydroxy acid or ester can also be varied widely; generally, however, the molar ratio of these two ingredients will be from 1:3 to 2:1, equimolar ratios being preferred. When operating with an acid catalyst which is a solvent for the polyamide, e. g., formic acid, enough acid is generally used to dissolve the polyamide. However, much smaller amounts are also effective. When operating at elevated temperatures, 1 to 10% of acid based on the weight of the polyamide is generally employed.

The condensation reaction wherein the polyamides are condensed with a hydroxy acid or ester is advantageously carried out at temperatures ranging from 50 to 150° C. However, temperatures from about room temperature (25° C.) to the decomposition temperature of the polyamide are operable.

The products so produced are polycarbonamides in which a plurality of the amide groups in the polymer chain have the structure

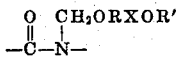

where X is a carbonyl or sulfonyl radical, R represents a divalent saturated aliphatic hydrocarbon radical, and R′ represents hydrogen or the radical obtained by removal of the OH group from a monohydric alcohol. To form the salts used in this invention R′ is replaced by M, where M is an alkali metal or ammonium or substituted ammonium, or an alkaline earth metal.

The term "hydrophilic" as used in this application is intended to denote compounds which in the form of thin layers, e. g., one to ten microns in thickness, are insoluble in water at 30° C. or below but are freely water-permeable.

The preferred starting materials of this invention are prepared from N-carbomethoxymethoxymethyl polycarbonamides which in turn are prepared from a linear polyamide, formaldehyde and methyl hydroxyacetate according to the procedures outlined in application Serial No. 539,399, filed June 8, 1944, now Patent No. 2,430,907 of November 18, 1947. As a preferred example, polyhexamethylenesebacamide is treated with formaldehyde and methyl hydroxyacetate to give rise to the N-substituted derivative, designated as N-carbomethoxymethoxymethyl polyhexamethylenesebacamide, which is insoluble in water. Hydrolysis of this polymer is brought about by means of an alkali metal hydroxide such as potassium or sodium hydroxide in methanol solution. The resulting potassium or sodium salt of N-carboxymethoxymethyl polyhexamethylene sebacamide is soluble in warm water but insoluble in cold water and is suitable for the practice of this invention.

The above methods of preparation may be used to give rise to a large variety of water-soluble polycarbonamides. The properties of the final product depend not only upon the original starting polycarbonamides but also upon the extent and kind of substitution of the nitrogen atoms and upon the method of hydrolysis employed in the final step. The preferred water-soluble polymer of this invention is prepared from N-carbomethoxymethoxymethyl polyhexamethylene sebacamide in which about 50–60% of the nitrogen atoms are substituted with the

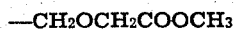

group, by hydrolysis with sodium or potassium hydroxide.

The following examples illustrate the methods of practicing this invention. All parts are by weight.

Example I

Ten parts of N-carboxymethoxymethyl polyhexamethylene sebacamide potassium salt, prepared from polyhexamethylene sebacamide by the procedure outlined in Example IV of Cairns application Serial No. 539,399, now Patent No. 2,430,907, and having 57% amide substitution, is dissolved in 50 parts of water by stirring at 80° C. for 30–60 minutes. To this solution is added 5.8 parts of ammonium bromide and 0.26 part of potassium iodide dissolved in 20 parts of water. From this point all operations are carried out in the absence of light. A solution of 7.65 parts of silver nitrate in 15 parts of water and 8 parts of ammonium hydroxide is added to the polymer-halide mixture with stirring at 40° C. The emulsion is ripened at 40° C. for 30–60 minutes, diluted with an equal volume of water and coated on paper. The element thus made is exposed to a negative and the latent image developed in a photographic developer made by admixing the following components:

| | Parts |
|---|---|
| p-Methylaminophenol sulfate | 3 |
| Sodium sulfite (anhydrous) | 45 |
| Hydroquinone | 12 |
| Sodium carbonate (anhydrous) | 67.5 |
| Potassium bromide | 1.5 |
| Water to make | 1000 |

The developed picture is fixed by bathing in a 25% solution of sodium thiosulfate (hypo) and hardened by immersion in 1% acetic acid solution for 1 minute. It is then freed of soluble salts by washing in water and dried. The resulting black and white positive print is markedly tougher, more flexible, and more resistant to cracking than the standard gelatin article.

Example II

The N-carboxymethoxymethyl polyhexamethylene sebacamide potassium salt of Example I is replaced by N-carboxymethoxymethyl polyhexamethylene adipamide potassium salt having substitution on 35% of the amide groups. The film element is exposed, developed, fixed, hardened and washed as in Example I to yield a black and white image. The resulting paper print is unaffected by hot water and remains nontacky even in storage under hot, humid conditions.

Example III

Twenty parts of the sodium salt of N-carboxymethoxymethyl polyhexamethylene sebacamide, prepared after the manner described in Example I, is dissolved in 170 parts of water and 10 parts of ethanol by stirring at 80° C. To 75 parts of this solution is added 12.4 parts of ammonium bromide and 0.17 part of potassium iodide in 20 parts of water. This solution is stirred in the dark at 40° C. while adding 18.9 parts of silver nitrate in 200 parts of water and 19 parts of ammonium hydroxide. The resulting emulsion is stirred at 40° C. for 60 minutes, cooled to room temperature and coagulated by adding 800 parts of acetone. The supernatant liquid is decanted and the coagulate is washed for one hour in running water while suspended in a cloth bag. The emulsion curds are then treated with 75 parts of polymer solution used above and mixed at 65° C. by stirring for 30 minutes. The emulsion is then coated on a cellulose acetate film base and processed to a black and white silver image as described in Example I. The resulting film is more flexible and appreciably tougher than the corresponding gelatin emulsion.

Example IV

A solution is made from 30 parts of N-carboxymethoxymethyl polyhexamethylene sebacamide potassium salt, prepared after the manner described in Example I, having 60% amide substitution and 90 parts of water. To 40 parts of this solution is added 29.4 parts of ammonium bromide, 0.58 part of potassium iodide and 100 parts of water and the resulting mixture stirred at 40° C. In the absence of light, 46 parts of silver nitrate in 60 parts of water and 50 parts of ammonium hydroxide is added at 40° C. in 30 seconds. The resulting emulsion is stirred at 40° C. for 60 minutes and cooled. It is then coagulated, using 600 parts of acetone, and the coagulate is washed for one hour in running water. Forty parts of the original nylon solution is added and stirred for 30 minutes at 40° C. The emulsion is coated onto a cellulose nitrate film base. The resulting film was exposed and processed as described in Example I. The film is highly wear-resistant and scratch-proof and shows exceptionally good performance in a motion picture projector.

Example V

Thirty parts of a 20% solution of N-carboxymethoxymethyl polyhexamethylene sebacamide potassium salt (58% amide substitution) prepared after the manner described in application Serial No. 539,399, now Patent No. 2,430,970, is mixed with 8.8 parts of ammonium bromide and 0.124 part of potassium iodide in 30 parts of water and stirred at 25° C. While stirring at this temperature in the absence of light, 12.8 parts of silver nitrate in 30 parts of water and 15 parts of ammonium hydroxide is added slowly. The temperature is then raised to 40° C. and stirred for 15 minutes at which time 20 parts of 20% solution of water-soluble nylon is added and stirring continued for 15 minutes. The emulsion is then allowed to stand overnight in the cold until gelation occurs. The gel is shredded and suspended in a cloth bag and washed by immersion in water and allowed to drain. The gelled emulsion is melted by stirring at 65° C. for 15 minutes and is then ready for coating. Photographic paper and film elements prepared from this emulsion are processed as in Example I to black and white silver images. The resulting articles are highly abrasion resistant and scratch-proof.

Example VI

The polycarbonamide of Example I is replaced by the potassium salt derived from polyhexamethylene sebacamide, formaldehyde and methyl lactate (as described in Example V of Cairns U. S. application Serial No. 439,399, now Patent No. 2,430,907) and a light-sensitive silver halide emulsion is prepared and coated onto a transparent film base and dried. The film element has properties similar to those described in the preceding examples and may be exposed and processed to finished pictures in like manner.

The hydrophilic N-carboxyalkoxymethyl polycarbonamide salts are not only useful as the binding agent for light-sensitive silver salts in radiation sensitive layers but may also be used as a water-permeable binder for other light-sensitive materials such as diazonium compounds, ammonium bichromate, fulgides, N-monoarylhydroxylamines and their nitrones, etc. They may also be used as the hydrophilic binding agent of filter layers which may have dyes dispersed therethrough or antihalation layers which have antihalation dyes or pigments dispersed therethrough, and as binding agents for non-diffusing color formers which are placed adjacent to light-sensitive silver halide layers.

Photographic emulsions comprising the hydrophilic polycarbonamides may be prepared according to the many methods well-known in the art. That is, conditions such as temperature, concentration and mode of addition of reactants, ripening and digestion periods, etc., may be varied upon the type of product desired. Further, ingredients to modify the emulsion may be added without affecting the properties of the binder. Such ingredients include sensitizing dyes (e. g., the cyanine dyes), emulsion sensitizers (e. g., N-allylthiourea), anti-fogging agents, pigments (e. g., carbon black, titanium dioxide), dyes, inorganic salts (e. g., sodium sulfate) and surface active agents, such as saponin and sodium alkyl sulfates of 8–18 carbon atoms.

Various types of color formers or dye intermediates capable of forming quinoneimine, indophenol or azomethine dyes on color-forming development can be incorporated in the emulsions. Thus, the phenols, naphthols, pyrazolones, acylacetamides, hydrindene, N-homophthalylamines, etc., particularly those of high molecular weight and which are immobile in gelatin emulsion layers can be used. Suitable color formers are described in United States Patents 2,108,602, 2,166,181, 2,178,612, 2,179,228, 2,179,238, 2,179,239, 2,182,815, 2,184,303, 2,186,849, 2,200,924, 2,283,276, and 2,328,652.

The method of the present invention is well adapted for preparing elements suitable for color photography, particularly by the method described in United States application Serial No. 528,944, filed March 31, 1944, now Patent No. 2,423,460. To prepare such elements, hydrophilic polycarbonamides of the above types are used which contain in addition to the N-carboxymethoxylmethyl salt substituents, substituents providing dye intermediate nuclei. Such dye intermediate or color-coupling groups may conveniently be introduced by reaction of the initial polycarbonamide with formaldehyde and a dye intermediate containing an aliphatic hydroxyl group, for example, N-methyl-N-beta-hydroxyethyl - 1 - acetoxy-2-naphthalenesulfonamide, at the time of introducing the N-carbomethoxymethyl substituent. On hydrolysis the salt of the N-carboxymethoxy methyl polycarbonamide is formed and the corresponding naphthol derivative is made available for coupling. Other dye intermediates or their precursors which may be used similarly are m-(beta-hydroxyethylamino)phenol, 1 - m - (beta-hydroxyethylamino)phenyl - 3 - methyl-5-pyrazolone, p-(beta-hydroxyethylamino)acetoacetanilide.

The degree of amide substitution necessary to confer the desired water-solubility properties is largely dependent upon the linear polyamide used as starting material. That is polyhexamethyleneadipamide requires the $—CH_2OCH_2COOM$ substituent, where M is an alkali metal, alkaline earth metal, ammonium or substituted ammonium group, on fewer of the amido nitrogen atoms than does polyhexamethylenesebacamide. It is preferred that the latter polymers be substituted on 50-60% of the nitrogen atoms but these limits may be varied as much as 5 or 10%. The polyhexamethyleneadipamides require substitution by this group on only 30-40% of the nitrogen atoms.

As mentioned before the hydrophilic polyamides of this invention are prepared from N-carbomethoxymethoxymethyl derivatives of linear polycarbonamides by hydrolysis with strong bases. Such bases are potassium, sodium and lithium hydroxide, ammonium and substituted ammonium hydroxides. In addition, other strong bases such as calcium, barium and magnesium hydroxides may be used.

The polymers used in this invention are soluble in water at 60-80° C. and when cooled to room temperature the solutions remain homogeneous. Small amounts of organic solvents such as alcohols of less than four carbon atoms may also be present. For example, 10-50% ethanol may be employed as solvent. The hydrophilic polyamides are insoluble in, but permeable to, cold water.

Surprisingly, it has been found that when silver halide grains are ripened in a solution of the hydrophilic polycarbonamide hereof, the Ostwald ripening process proceeds rapidly. In fact, the formation of well-defined halide crystals proceeds under conditions unfavorable to ripening in gelatin systems. The well-defined ripening phenomenon is quite unexpected and contributes to the high sensitivity of the nylon-silver halide emulsions. Hence it is one of the advantages of the hydrophilic polyamides over previously proposed synthetic polymers. This behavior is in sharp contrast to the synthetic polymers previously proposed as silver halide binders, such as polyvinyl alcohol and modified natural products such as cellulosic derivatives.

As many widely different embodiments of this invention can be made without departing from the spirit and scope thereof, it is to be understood that the invention is not to be limited except as defined by the claims.

What is claimed is:

1. A photographic element bearing at least one layer composed of a hydrophilic salt of a N-carboxyalkoxy methyl polycarbonamide which has a unit length of at least seven wherein the average number of carbon atoms separating the amide groups is at least two and 30 to 60% of the recurring amido hydrogen atoms are replaced with the said carboxyalkoxymethyl groups, said layer having dispersed therethrough a light-sensitive silver halide.

2. A photographic element comprising a support bearing at least one layer composed of a hydrophilic alkali metal salt of N-carboxymethoxymethyl polycarbonamide which has a unit length of at least seven wherein the average number of carbon atoms separating the amide groups is at least two and 30 to 60% of the recurring amido hydrogen atoms are replaced with the said carboxyalkoxymethyl groups, said layer having uniformly dispersed therethrough light-sensitive silver halides.

3. A photographic element as set forth in claim 2 wherein said alkali metal salt is of N-(α-carboxyethoxy)methyl polyhexamethylenesebacamide.

4. A photographic element comprising a support bearing at least one layer composed of the hydrophilic potassium salt of N-carboxymethoxymethyl polyhexamethylenesebacamide having uniformly dispersed therethrough light-sensitive silver halides said sebacamide having 50 to 60% of the recurring amido hydrogen atoms replaced with carboxymethoxymethyl groups.

5. The process which comprises exposing a photographic element bearing at least one layer composed of a hydrophilic salt of a N-carboxyalkoxymethyl polycarbonamide which has a unit length of at least seven wherein the average number of carbon atoms separating the amide groups is at least two and 30 to 60% of the recurring amido hydrogen atoms are replaced with the said carboxyalkoxymethyl groups, said layer having dispersed therethrough a light-sensitive silver halide to an object, developing and fixing in a non-acid bath the exposed element and treating the resulting element in a dilute solution of an acid.

6. The process which comprises exposing a photographic element comprising a support bearing at least one layer composed of a hydrophilic alkali metal salt of N-carboxymethoxymethyl polycarbonamide which has a unit length of at least seven wherein the average number of carbon atoms separating the amide groups is at least two and 30 to 60% of the recurring amido hydrogen atoms are replaced with the said carboxyalkoxymethyl groups, said layer having uniformly dispersed therethrough light-sensitive silver halides to an object, developing the exposed element, fixing in a non-acid bath the developed element and treating the fixed element in an aqueous solution containing 0.1 to 5% by weight of an acid.

7. A photographic element comprising a support bearing at least one layer composed of a hydrophilic polycarbonamide having a unit length of at least seven wherein the average number of carbon atoms separating the amide groups is at least two and 30 to 60% of the recurring amide groups have the formula

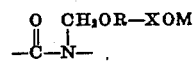

wherein X is a member of the group consisting of sulfonyl and carbonyl groups and M is a cation taken from the class consisting of alkali metals, alkaline earth metals, and ammonium groups, and R is a divalent, saturated, hydrocarbon radical of one to six carbon atoms, said layer having light-sensitive silver salts dispersed therethrough.

DAVID MALCOLM McQUEEN.
CLAY WEAVER.

REFERENCES CITED

The following references are of record in the file of this patent:

UNITED STATES PATENTS

| Number | Name | Date |
|---|---|---|
| 1,964,136 | Prufer et al. | June 26, 1934 |
| 2,299,839 | McQueen | Oct. 27, 1942 |
| 2,430,907 | Cairns | Nov. 18, 1947 |

Certificate of Correction

Patent No. 2,465,109. March 22, 1949.

DAVID MALCOLM McQUEEN ET AL.

It is hereby certified that errors appear in the printed specification of the above numbered patent requiring correction as follows:

Column 7, line 36, Example V, for "Patent No. 2,430,970" read *Patent No. 2,430,907*; line 64, Example VI, for "Serial No. 439,399" read *Serial No. 539,399*; and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*